United States Patent [19]

Ohta et al.

[11] 4,060,441
[45] Nov. 29, 1977

[54] METHOD FOR FORMING A TRANSPARENT PROTECTIVE COATING ON A PHOTOGRAPH OR THE LIKE

[75] Inventors: Wasaburo Ohta; Tatsuya Watanabe, both of Tokyo, Japan

[73] Assignee: Kabushiki Kaisha Ricoh, Tokyo, Japan

[21] Appl. No.: 594,182

[22] Filed: July 8, 1975

Related U.S. Application Data

[62] Division of Ser. No. 448,555, March 6, 1974, abandoned.

[30] Foreign Application Priority Data

Apr. 20, 1973 Japan ................................ 48-44914
May 1, 1973 Japan ................................ 48-49479

[51] Int. Cl.$^2$ ............................................ B32B 31/20
[52] U.S. Cl. ................................. 156/234; 156/230; 156/238; 156/495; 427/148; 427/152
[58] Field of Search ................... 427/148, 152, 172; 428/914, 447, 451; 156/230, 238, 164, 163, 234, 229, 494, 495, 542

[56] References Cited

U.S. PATENT DOCUMENTS

| | | | |
|---|---|---|---|
| 2,417,060 | 3/1947 | Capstaff | 156/238 |
| 2,556,078 | 6/1951 | Francis, Jr. | 156/238 |
| 3,511,732 | 5/1970 | Brookfield et al. | 156/230 X |
| 3,575,754 | 4/1971 | Duerden et al. | 156/238 X |

*Primary Examiner* — William A. Powell
*Assistant Examiner* — Thomas Bokan
*Attorney, Agent, or Firm* — Frank J. Jordan

[57] ABSTRACT

A releasing layer is formed on a heat resistant backing sheet and a transparent thermal bonding layer is formed on top of the releasing layer to provide a coating material. The sheet of material such as photograph is mated with the coating material. When the sheet material is a photograph its emulsion side contacts the bonding layer and is passed through a heated roller assembly to bond the bonding layer to the photograph. The backing sheet and the releasing layer are then separated from the sheet material or photograph and bonding layer.

26 Claims, 13 Drawing Figures

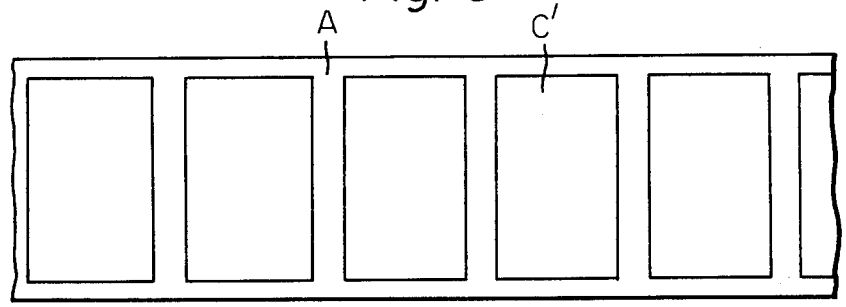
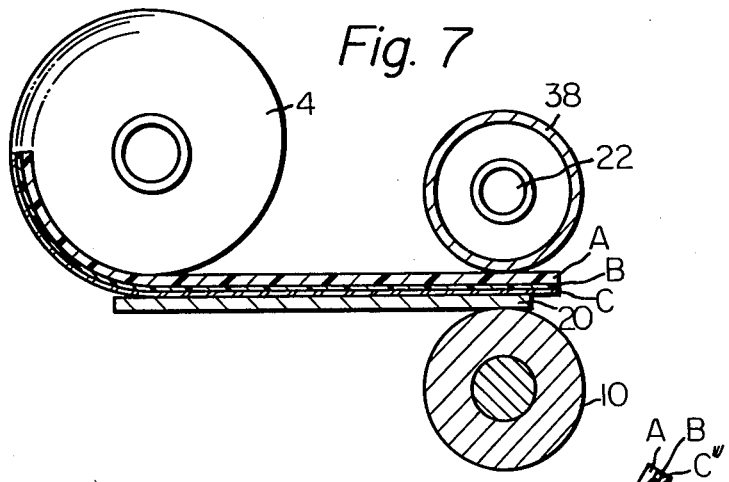
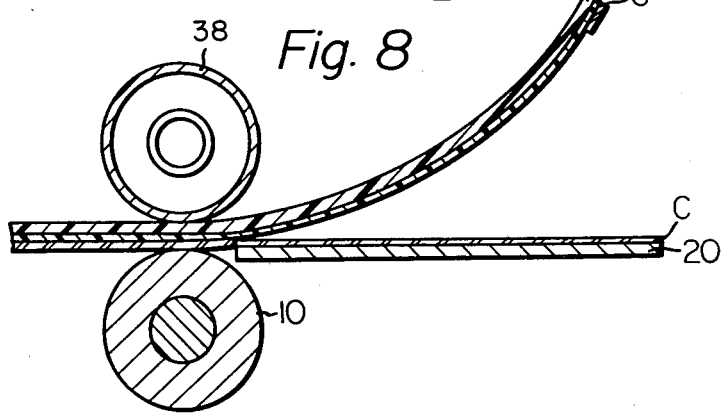

METHOD FOR FORMING A TRANSPARENT PROTECTIVE COATING ON A PHOTOGRAPH OR THE LIKE

This is a division of application Ser. No. 448,555, filed Mar. 6, 1974, now abandoned.

The present invention relates to a method for forming a transparent protective coating on a photograph or the like.

It has been common in recent years to provide a transparent, protective coating on photographs, identification cards, railroad passes, and other small sheets which are subjected to frequent use. The protective coating serves the dual function of protecting the sheet from mutilation and dirt. The usual procedure is to laminate a plastic sheet onto the photograph, etc. Prior art methods include providing a transparent sheet with adhesive on one side thereof for bonding to the photograph. This method has a drawback in that the adhesive is not completely transparent, and partially masks the clarity of the photograph. Thermoplastic sheets may also be bonded to photographs using heat and pressure, but the thermoplastic sheets are difficult to use, and may subsequently wrinkle when cooled. Another prior art method is to spray or coat a solution of, for example, vinyl resin onto the emulsion of the photograph. Vinyl resin, however, will stick to almost anything, and is therefore difficult to handle and may also wrinkle upon polymerization. The apparatus for applying any of the methods described above is necessarily expensive and subject to mechanical failure.

It is therefore an object of the present invention to provide a method of forming a transparent protective layer on a sheet such as a photograph which is simple and convenient to perform and which eliminates the above mentioned drawbacks of the prior art.

The above and other objects, features and advantages of the invention will become apparent from the following detailed description taken in conjunction with the attached drawings in which like elements are designated by like reference numerals, and in which:

FIG. 6 is a top view of the coating material shown in FIG. 2;

FIG. 7 is a schematic sectional view showing the coating material of FIG. 6 as being in roll form;

FIG. 8 is a schematic sectional view illustrating a final step in the method according to the invention;

Figure 1:
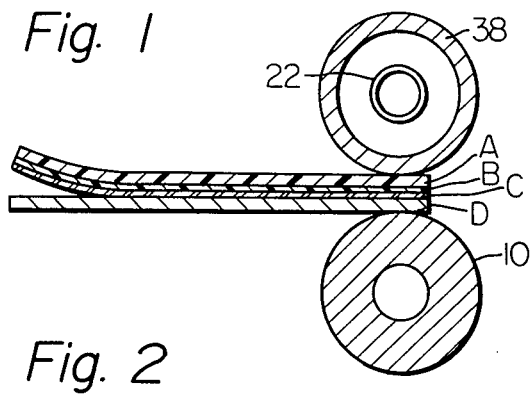
FIG. 1 is a schematic sectional view illustrating the method of the invention.
Figure 2:
FIG. 2 is a schematic sectional view of a coating material used in a method of the invention.
Figure 3:
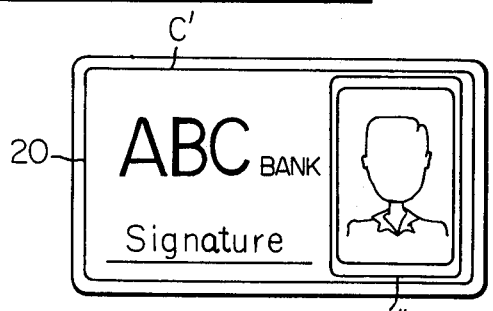
FIG. 3 is a view of an identification card to which the invention is applicable.

FIGS. 1 and 2 illustrate the basic method of the invention. A coating material (no numeral) is provided by forming a releasing layer B on a heat resistant backing sheet A, and then forming a transparent thermal bonding layer C on top of the releasing layer B. A sheet material D, which may be a photograph, etc., is placed in contact with the coating material so that the surface to be protected, in the case of a photograph the emulsion surface, is in face to face contact with bonding layer C. The sheet material D and coating material are then fed through a roller and heater assembly comprising a hollow pressure or first roller 38, a backing or second roller 10 and a heater 22 arranged inside the first roller 38. In this manner, the bonding layer C is heated under pressure and bonds to the sheet material D to constitute a protective coating. Due to the provision of the releasing layer B, the backing sheet A and the releasing layer B may be separated from the sheet material D and bonding layer C so that the bonding layer C only adheres to the sheet material D, as is clearly shown in FIG. 2. The coating material is preferably in roll form, and may have sprocket holes 1a (see FIG. 10) formed through one or both edge portions. The sheet material D may be either in the form of individual sheets or in the form of a roll. In addition, the bonding layer C may be either applied onto the entire surface of the backing sheet A and releasing layer B, or only onto selected portions thereof. The latter case is illustrated in FIG. 3 and the bonding layer C may be arranged to cover a portion enclosed by a broken line C' of an identification card 20, or a portion enclosed by a broken line C" corresponding to a photograph adhered to the identification card 20. The sheet material D will herein be considered as being in the form of the card 20. As shown in FIG. 6, portions C' of FIG. 3 are shown as being equally spaced on the backing sheet A.

A heat resisting backing sheet A may be formed of a suitable material such as polypropylene, acetate or fluorocarbon resin. The releasing layer B may be formed of silicone, silicone resin or acrylic resin. The thermal bonding layer C may be of vinyl chloride, vinyl acetate or polyamide. If, however, the backing sheet contains a material such as fluorocarbon resin or silicone resin which acts as a releasing agent for the bonding layer C, the releasing layer B may be omitted.

Figure 4:
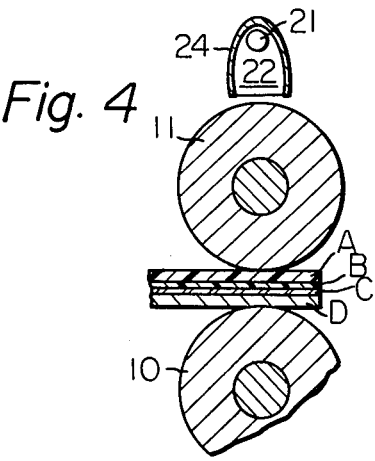
FIG. 4 is a schematic sectional view illustrating a roller and heater assembly constituting a part of an apparatus embodying the invention.
Figure 5:
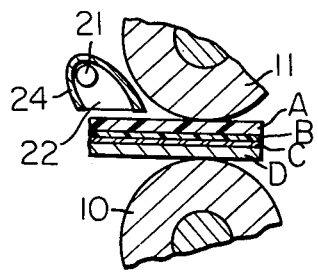
FIG. 5 is similar to FIG. 4 but shows another roller and heater assembly.

As shown in FIG. 1, the first roller 38 is hollow, and the heater 22 is disposed inside the roller 38. Alternative arrangements are shown in FIGS. 4 and 5. In FIG. 4, the heater 22 comprises a heating element 21 which may be, for example, a nichrome wire of infra-red lamp. A curved reflector 24 is employed to direct heat from the heating element 21 onto the outer surface of a modified first roller 11, here shown as solid. It is desirable to have the circumference of the first roller 11 or 38 larger than the length of the card 20 to minimize heat loss. The first roller 11 may be made of a heat storing material such as silicone rubber, and the first roller 38 may be made of a heat conductive material such as aluminum or copper. In FIG. 5, the heater 22 is arranged to heat the bonding layer C before the card 20 and the coating material are fed through the rollers 10 and 11. Although not shown, one or more heaters 22 may be arranged to heat both the rollers 10 and 11.

FIG. 7 shows the card 20 and the coating material in a position to be fed between the rollers 10 and 38, and FIG. 8 shows the same after feeding between the rollers 10 and 38. Numeral 4 designates one roller of a first feed roller assembly which will be described later. In FIG. 8, it will be seen that a trim portion C''' has adhered to the releasing layer B because the corresponding portion C' was provided slightly oversize. In this case, burrs (not shown) of the bonding layer C material may adhere to the edges of the card 20. However, it has been found on practice that such burrs can be easily removed by hand.

Figure 9:
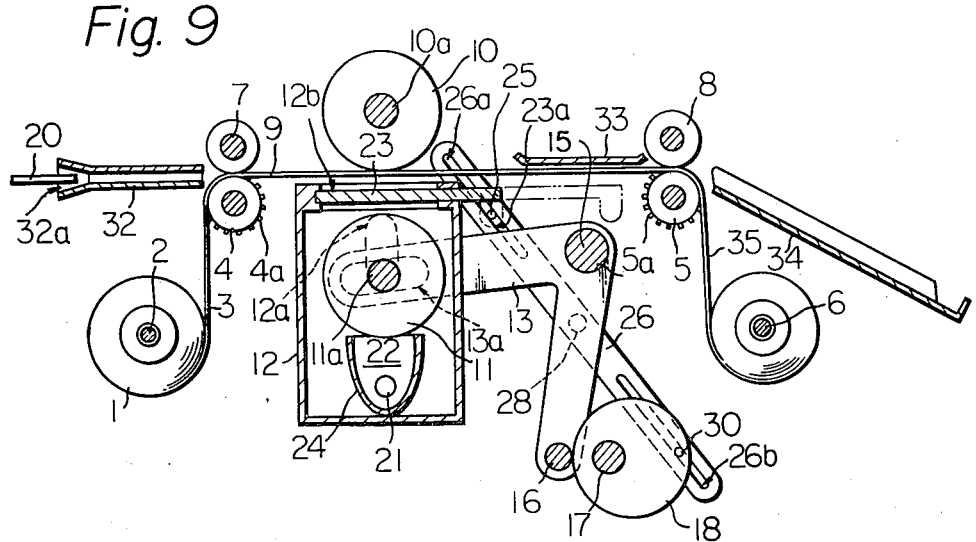
FIG. 9 is a side sectional view of an embodiment of an apparatus according to the invention.
Figure 10:
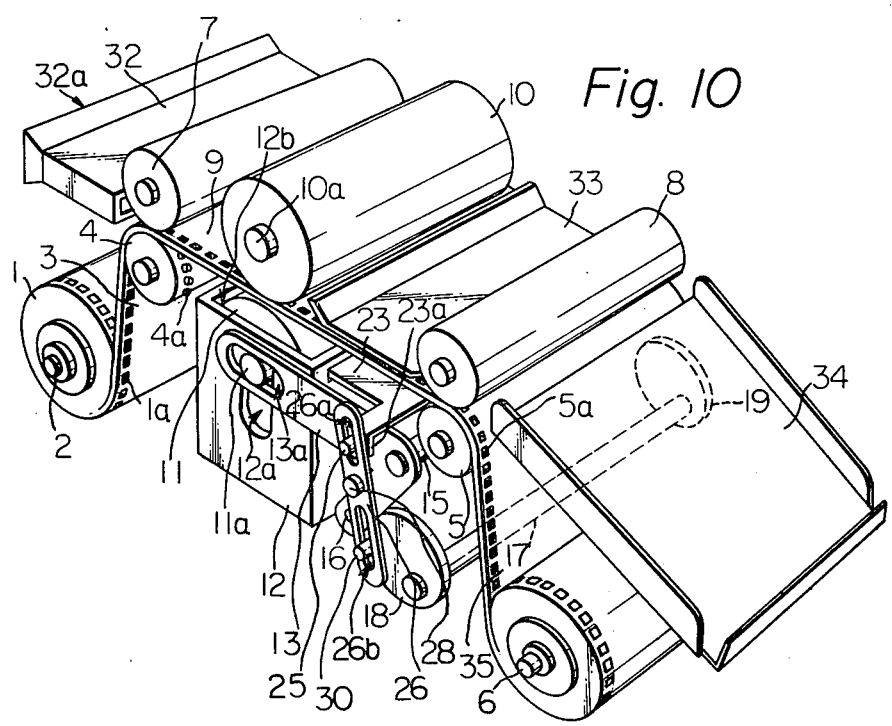
FIG. 10 is a perspective view of the apparatus of FIG. 9.

FIGS. 9 and 10 show an apparatus of the invention to apply the coating material onto the card 20. The coating material is provided in the form of a roll 1 mounted on a reel 2, and is wound around the roller 4 and a roller 5 of a second feed roller assembly and finally onto a take-up reel 6. The rollers 4 and 5 are provided with sprockets 4a and 5a respectively to engage in the sprocket holes 1a. Rollers 7 and 8 are provided in conjunction with the rollers 4 and 5 respectively. The coating material has a working portion 3, a tension portion 9 and a backing portion 35 as will be described below. The rollers 4 and 5 maintain the tension portion 9 of the coating material in a state of tension so that wrinkles will not occur when the bonding layer C is adhered to the card 20 and cooled. A keeper plate 33, a receiving table 34 and a guide member 32 having an inlet slot 32a to receive the card 20 are also shown, and will be described in detail below.

The rollers 10 and 11 are respectively mounted on shafts 10a and 11a with the second roller 10 arranged vertically above the first roller 11. A container or box 12 is provided with vertical slots 12a (only one is visible in the drawings), a rail groove 12b at its top portion and a cover or lid 23 slidable in the rail groove 12b to open or close the box 12. The first roller 11 is disposed in the box 12 with the ends of the shaft 11a being vertically slidable in the grooves 12a. The heater 22 is located below the first roller 11 to heat the surface thereof. A mechanism comprising a first or bell-crank lever 13, a second lever 26 and a cam 18 are provided to move the first roller 11 from a standby position shown in FIG. 9 in which the lid 23 is closed to an operating position shown in FIG. 10 in which the lid 23 is open. The first lever 13 is pivotable about a shaft 15, and has a slot 13a formed through one arm thereof and the other arm fixed to a shaft 16. A similar lever 13 is provided on the other side of the apparatus, but is not visible in the drawings. The ends of the shaft 11a are slidable in the slots 13a of the levers 13.

A bent portion 23a of the lid 23 has a pin 25 fixed thereto. The second lever 26 is pivotable about a shaft 28 and has a slot 26a formed through one arm in which the pin 25 is slidable. A similar slot 26b is formed through the other end of the lever 26, and a pin 30 fixed to the cam 18 is slidable in the slot 26b. The cam 18 is shown as being eccentrically mounted on a drive shaft 17, which may be rotated by means of an electromagnetic or spring clutch (not shown). If the heater 22 is small, the first roller 11 may be rotated slowly in the standby position by means such as a capstan roller (not shown) to heat the entire surface thereof. The box 12 may be made of stainless steel and lined with asbestos.

In operation, the card 20 is fed through the guide member 32 toward the rollers 10 and 11. When the card 20 reaches a pre-synchronized position, a switch (not shown) is closed to rotate the take-up reel 4 and the feed rollers 4 and 5 to move the coating material through the apparatus. Simultaneously, the cam drive shaft 17 is rotated clockwise by ½ turn. The surface of the cam 18 thus moves the shaft 16 leftward as shown in FIG. 9 so that the first lever 13 is rotated clockwise and the first roller 11 is moved upward to the operating position shown in FIG. 10 in which it protrudes from the box 12 and is adjacent to the second roller 10. Simultaneously, the second lever 26 is also rotated clockwise and the lid 23 is moved rightward as shown in FIG. 9 to the open position of FIG. 10. The card 20 is then fed in face to face contact with the coating material between the rollers 10 and 11 which apply heat and pressure thereto to bond the bonding layer C to the card 20. The card 20 then passes between the rollers 5 and 8 and is ejected onto the receiving table 34. At this point, another switch (not shown) is actuated to stop the transport of the coating material and cause the drive shaft 17 to be rotated counterclockwise by turn. This results in the first and second levers 13 and 26 respectively rotating counterclockwise to lower the first roller 11 to the standby position and close the lid 23 to prevent loss of heat from the box 12. If desired, the slots 12a of the box 12 may be provided with Telemp or slide shutters (not shown) which are operated by the shaft 11a. Also, the lid 23 may be opened and closed by means of a wire or equivalent means although not shown. The cam 18 and levers 13 and 26 may be omitted entirely if the card 20 is sufficiently thick, and an opening (not shown) is provided through the top of the lid 23 through which the first roller 11 slightly protrudes. It will be appreciated that the apparatus shown in FIGS. 9 and 10 is very economical in that the first roller 11 is stored in the box 12 when not in use, and that a considerable saving of energy can be accomplished.

Figure 11:
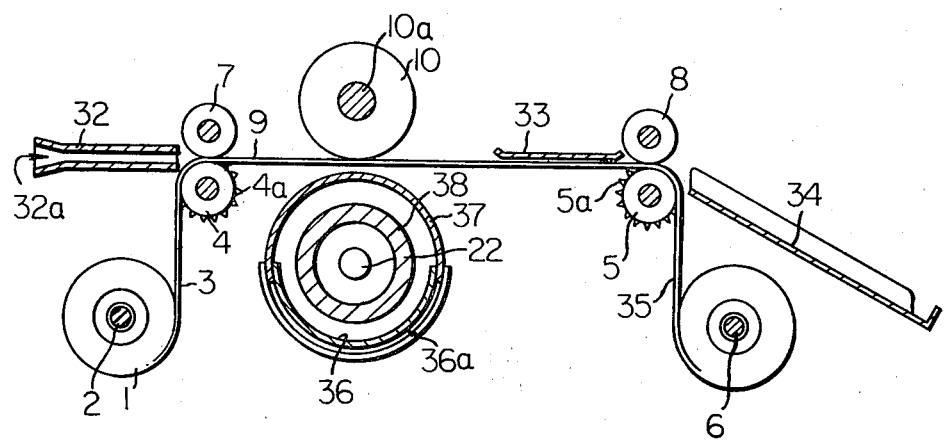
FIG. 11 is a partial side sectional view showing a modification of the apparatus of FIG. 9.

FIG. 11 shows an alternative form of first roll 38, which is here mounted within a cylindrical box 36. The heater 22 is disposed inside the roller 38 as before, and the roller 38 is movable vertically by means of slots (not shown) and a mechanism similar to that of FIGS. 9 and 10. The box 36 has semi-circular grooves 36a in which a semi-cylindrical lid 37 is slidable to open and close the box 36. The lid 37 may be actuated by a cable, linkage, etc., (not shown).

Figure 12:
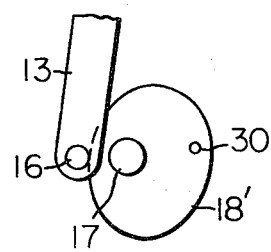
FIG. 12 is a side sectional view of a cam assembly constituting a modification of part of the apparatus of FIG. 9.

FIG. 12 shows an alternative form of the cam 18, here designated as 18', which has a non-circular profile.

Figure 13:
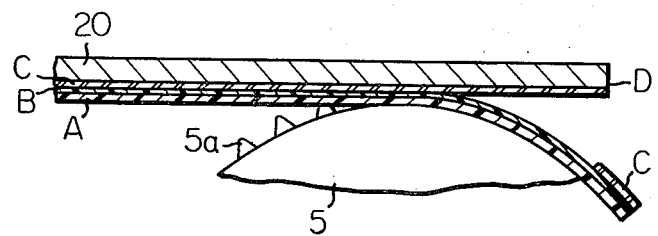
FIG. 13 is a partial side view further illustrating the step shown in FIG. 8.

FIG. 13 illustrates how the card 20 and bonding layer C are separated from the backing sheet A and releasing layer B. The backing portion 35 comprising the backing sheet A and the releasing layer B are pulled downward around the roller 5 by means of the sprocket 5a and sprocket holes 1a. The keeper plate 33, however, applies a normal force to the upper face of the card 20, and due to the releasing effect of the releasing layer B and the stiffness of the card 20 and bonding layer C, the card 20 and bonding layer C move rightward as shown in FIG. 13 to separate from the backing portion 35 and be ejected onto the receiving table 34.

Certain specific embodiments of the present invention have been shown and described for the purpose of illustration but it will be apparent that various modifications and other embodiments are possible within the scope of the present invention. It is to be understood therefore that the present invention is not limited to the specific arrangement shown but in its broadest aspects it includes all equivalent embodiments and modifications which come within the scope of the present invention.

What is claimed is:

1. A method of forming a protective coating on a sheet material, comprising the steps of:
   a. preparing a coating material by forming a releasing layer on a heat resistant backing sheet and then releasably adhering a transparent thermal bonding layer onto the releasing layer, the bonding layer comprising a material selected from the group consisting of vinyl choloride, vinyl acetate and polyamide;

b. maintaining the coating material in a state of tension;

c. placing the sheet material and the coating material together so that the bonding layer is in face-to-face contact with the sheet material;

d. applying heat and pressure to bond the bonding layer to the sheet meterial; and e. separating both the backing sheet and the releasing layer from the bonding layer so that the bonding layer remains bonded to the sheet material to constitute the protective coating, said separating step (e) comprising applying a force to said coated sheet material in a direction perpendicular to the general plane of said coated sheet material, said force being applied to the said coated sheet material at a location just preceding the actual separation of the backing sheet and release layer from the bonding layer, whereby said applied force facilitates separation of said backing sheet and release layer from said bonding layer.

2. The method according to claim 1, in which the backing sheet has the property whereby the adhesion thereto of the bonding layer is low even when heat and pressure are applied.

3. The method according to claim 1, in which the backing sheet comprises a material selected from the group consisting of fluorocarbon resin and silicone resin.

4. The method according to claim 1, in which the backing sheet comprises a material selected from the group consisting of polypropylene, acetate and fluorocarbon resin.

5. The method according to claim 1, in which the releasing layer comprises a material selected from the group consisting of silicone resin and acrylic resin.

6. The method according to claim 5, in which said coating material is maintained in a state of tension by providing the coating material with spaced sprocket holes and passing the coating material over rollers having sprocket wheels with sprockets engaging said sprocket holes, said separating step (e) being effected by passing said backing sheet and release layer along an arcuate path by passing at least partially about one of said rollers having sprockets wheels, and applying a force normal to the general plane of said coated sheet material just before said backing sheet and release layer pass over said one roller such that said normal force applied to said coated sheet material tends to maintain a generally straight line path of travel for said coated sheet material as said release layer travels along said arcuate path over said one roller, whereby said applied normal force facilitates separation of said backing sheet and release layer from said bonding layer.

7. The method according to claim 6, in which said sheet material on which said protective coating is applied is a card which is relatively stiff such that said normal force applied to said card prevents the card from following the arcuate path of said backing sheet and release layer.

8. The method according to claim 1, in which said maintaining step (b) is effected in a positive manner utilizing engaging elements engaging spaced openings in said coating material.

9. The method according to claim 1, in which said sheet material on which the protective coating is applied comprises cards and said backing sheet is an elongated web, said cards being fed and placed into face-to-face contact with said coating material intermittently, and applying said heat and pressure intermittently in synchronism with the feeding of said cards.

10. A method of forming a protective coating on a sheet material, comprising the steps of:

a. preparing a coating material by forming a releasing layer on a heat resistant backing sheet and then releasably adhering a transparent thermal bonding layer onto the releasing layer, the bonding layer comprising a material selected from the group consisting of vinyl chloride, vinyl acetate and polyamide;

b. maintaining the coating material in a state of tension;

c. placing the sheet material and the coating material together so that the bonding layer is in face-to-face contact with the sheet material;

d. applying heat and pressure to bond the bonding layer to the sheet material; and e. separating both the backing sheet and the releasing layer from the bonding layer so that the bonding layer remains bonded to the sheet material to constitute the protective coating, said releasing layer comprising a material selected from the group consisting of silicone resin and acrylic resin, said coating material being maintained in a state of tension by providing the coating material with spaced sprocket holes and passing the coating material over rollers having sprocket wheels with sprockets engaging said sprocket holes, said separating step (e) being effected by passing said backing sheet and release layer along an arcuate path by passing at least partially about one of said rollers having sprocket wheels, and applying a force normal to the general plane of said coated sheet material just before said backing sheet and release layer pass over said one roller such that said normal force applied to said coated sheet material tends to maintain a generally straight line path of travel for said coated sheet material as said release layer travels along said arcuate path over said one roller, whereby said applied normal force facilitates separation of said backing sheet and release layer from said bonding layer.

11. The method according to claim 10, in which said sheet material on which said protective coating is applied is a card which is relatively stiff such that said normal force applied to said card prevents the card from following the arcuate path of said backing sheet and release layer.

12. The method according to claim 10, in which the backing sheet has the property whereby the adhesion thereto of the bonding layer is low even when heat and pressure are applied.

13. The method according to claim 10, in which the backing sheet comprises a material selected from the group consisting of fluorocarbon resin and silicone resin.

14. The method according to claim 10, in which the backing sheet comprises a material selected from the group consisting of polypropylene, acetate and fluorocarbon resin.

15. The method according to claim 10, in which said maintaining step (b) is effected in a positive manner utilizing engaging elements engaging spaced openings in said coating material.

16. The method according to claim 10, in which said separating step (e) comprises applying a force to said coated sheet material in a direction perpendicular to the general plane of said coated sheet material, said force being applied to said coated sheet material at a location just preceding the actual separation of the backing sheet and release layer from the bonding layer, whereby said applied force facilitates separation of said backing sheet and release layer from said bonding layer.

17. The method according to claim 10, in which said sheet material on which the protective coating is applied comprises cards and said backing sheet is an elongated web, said cards being fed and placed into face-to-face contact with said coating material intermittently, and applying said heat and pressure intermittently in synchronism with the feeding of said cards.

18. A method of forming a protective coating on a sheet material, comprising the steps of:
   a. preparing a coating material by forming a releasing layer on a heat resistant backing sheet and then releasably adhering a transparent thermal bonding layer onto the releasing layer, the bonding layer comprising a material selected from the group consisting of vinyl chloride, vinyl acetate and polyamide;
   b. maintaining the coating material in a state of tension;
   c. placing the sheet material and the coating material together so that the bonding layer is in face-to-face contact with the sheet material;
   d. applying heat and pressure to bond the bonding layer to the sheet material; and
   e. separating both the backing sheet and the releasing layer from the bonding layer so that the bonding layer remains bonded to the sheet material to constitute the protective coating, said sheet material on which the protective coating is applied comprising cards and said backing sheet being an elongated web, said cards being fed and placed into face-to-face contact with said coating material intermittently, and applying said heat and pressure intermittently in synchronism with feeding of said cards.

19. The method according to claim 18, in which the backing sheet has the property whereby the adhesion thereto of the bonding layer is low even when heat and pressure are applied.

20. The method according to claim 18, in which the backing sheet comprises a material selected from the group consisting of fluorocarbon resin and silicone resin.

21. The method according to claim 18, in which the backing sheet comprises a material selected from the group consisting of polypropylene, acetate and fluorocarbon resin.

22. The method according to claim 18, in which the releasing layer comprises a material selected from the group consisting of silicone resin and acrylic resin.

23. The method according to claim 18, in which said maintaining step (b) is effected in a positive manner utilizing engaging elements engaging spaced openings in said coating material.

24. The method according to claim 18, in which the separating step (e) comprises applying a force to said coated sheet material in a direction perpendicular to the general plane of said coated sheet material, said force being applied to said coated sheet material at a location just preceding the actual separation of the backing sheet and release layer from the bonding layer, whereby said applied force facilitates separation of said backing sheet and release layer from said bonding layer.

25. The method according to claim 22, in which said coating material is maintained in a state of tension by providing the coating material with spaced sprocket holes and passing the coating material over rollers having sprocket wheels with sprockets engaging said sprocket holes, said separating step (e) being effected by passing said backing sheet and release layer along an arcuate path by passing at least partially about one of said rollers having sprocket wheels, and applying a force normal to the general plane of said coated sheet material just before said backing sheet and release layer pass over said one roller such that said normal force applied to said coated sheet material tends to maintain a generally straight line path of travel for said coated sheet material as said release layer travels along said arcuate path over said one roller, whereby said applied normal force facilitates separation of said backing sheet and release layer from said bonding layer.

26. The method according to claim 25, in which the sheet material on which said protective coating is applied is a card which is relatively stiff such that said normal force applied to said card prevents the card from following the arcuate path of said backing sheet and release layer.

* * * * *